US011138605B2

(12) United States Patent
Aabye et al.

(10) Patent No.: US 11,138,605 B2
(45) Date of Patent: Oct. 5, 2021

(54) ONLINE AUTHENTICATION IN ACCESS TRANSACTIONS

(71) Applicant: Visa International Service Association, San Francisco, CA (US)

(72) Inventors: Christian Aabye, Foster City, CA (US); Eric Schindewolf, Danville, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1455 days.

(21) Appl. No.: 14/314,742

(22) Filed: Jun. 25, 2014

(65) Prior Publication Data

US 2015/0012434 A1    Jan. 8, 2015

Related U.S. Application Data

(60) Provisional application No. 61/842,230, filed on Jul. 2, 2013.

(51) Int. Cl.
| | |
|---|---|
| *G06Q 20/40* | (2012.01) |
| *G06Q 20/02* | (2012.01) |
| *G06Q 20/38* | (2012.01) |
| *G06Q 20/36* | (2012.01) |

(52) U.S. Cl.
CPC ......... *G06Q 20/401* (2013.01); *G06Q 20/027* (2013.01); *G06Q 20/3674* (2013.01); *G06Q 20/3821* (2013.01); *G06Q 20/4016* (2013.01)

(58) Field of Classification Search
None
See application file for complete search history.

(56) References Cited

U.S. PATENT DOCUMENTS

| | | | |
|---|---|---|---|
| 7,567,920 B2 | 7/2009 | Hammad | |
| 8,346,670 B2 | 1/2013 | Hasson | |
| 8,700,513 B2 | 4/2014 | Hammad | |
| 8,799,122 B1* | 8/2014 | Del Favero | G06Q 40/02 705/35 |
| 2003/0081747 A1* | 5/2003 | Ahlstrom | H04M 11/025 379/102.06 |
| 2008/0040271 A1* | 2/2008 | Hammad | G06Q 20/085 705/41 |
| 2008/0179394 A1* | 7/2008 | Dixon | G06Q 20/027 235/380 |
| 2011/0000962 A1 | 1/2011 | Chan | |

(Continued)

*Primary Examiner* — Jacob C. Coppola
*Assistant Examiner* — Timothy Paul Sax
(74) *Attorney, Agent, or Firm* — Kilpatrick Townsend & Stockton LLP (57) ABSTRACT

Embodiments of the invention are directed to access transactions. A gate access device may interact with a payment card such as a credit card. The gate access device may generate and transmit a first authorization request message to a payment processing network computer. The first authorization request message does not include an amount for the transaction, but only contains identification information. A first authorization response message is transmitted back to the gate access device. At a later point in time, a second authorization request message containing the transaction amount is transmitted from the gate access device to the issuer, and a response is received from the issuer.

17 Claims, 6 Drawing Sheets

(56) References Cited

U.S. PATENT DOCUMENTS

| | | | |
|---|---|---|---|
| 2011/0107436 A1* | 5/2011 | Cholas | H04N 21/2541 |
| | | | 726/29 |
| 2013/0041823 A1* | 2/2013 | Wagner | G06Q 20/32 |
| | | | 705/44 |
| 2013/0304648 A1 | 11/2013 | O'Connell | |

* cited by examiner

ONLINE AUTHENTICATION IN ACCESS TRANSACTIONS

CROSS-REFERENCES TO RELATED APPLICATIONS

This application is a non-provisional of and claims the benefit of the filing date of U.S. provisional application No. 61/842,230, filed on Jul. 2, 2013, which is herein incorporated by reference in its entirety for all purposes.

BACKGROUND

Portable consumer devices such as credit and debit cards have been used to conduct transit transactions. In a transit transaction using a credit or a debit card, the credit or debit card is passed by a reader in a gate at a transit facility. The data from the credit or debit card is read and the patron using the credit or debit card is allowed to pass into a restricted area in the transit facility.

While such transactions are useful, many improvements can be made. For example, fraudulent transactions are difficult to identify, since any fraud analyses are performed locally at a transit computer. The transit computer may have limited access to fraud tools and fraud data involving the credit or debit card so the effectiveness of local fraud tools is limited. For example, a patron may have conducted a fraudulent transaction at a restaurant using the credit card, and may then subsequently use the same credit card at a transit gate at the train station to gain access to transportation. The transit computer at the train station would have no knowledge of the fraudulent transaction at the restaurant and may allow the patron to access the transit system even though it is likely that the transit transaction is fraudulent. Further, patrons using such credit or debit cards need to be able quickly pass into the restricted area.

Embodiments of the invention address these and other problems individually and collectively.

SUMMARY

Embodiments of the invention are directed to methods and systems for conducting access transactions such as transit transactions.

One embodiment of the invention is directed to a method. The method comprises reading, by a gate access device, identification information from a portable consumer device associated with a user that is conducting an access transaction. The method also includes generating, by the gate access device or a host computer coupled to the gate access device, a first authorization request message comprising the identification information without a transaction amount for the access transaction. The first authorization request message is used to authenticate the portable consumer device and is not used to authorize the access transaction. The method also includes transmitting, to a server computer, the first authorization request message, receiving, from the server computer, an authorization response message comprising an authentication result, allowing the user to enter a restricted area restricted by the gate access device when the authentication result is positive, generating, by the gate access device or the access host computer, a second authorization request message, transmitting the second authorization request message comprising the identification information and the transaction amount amount for the access transaction to the server computer, and receiving a second authorization response message from the server computer. The second authorization response message indicates whether the access transaction is authorized or not authorized.

Another embodiment of the invention is directed to a gate access device comprising a processor, a reader coupled to the processor, and a non-transitory computer readable medium coupled to the processor. The non-transitory computer readable medium comprises code executable by the processor. The code is executable by the processor for implementing a method comprising reading identification information from a portable consumer device associated with a user that is conducting an access transaction, and generating a first authorization request message comprising the identification information without a transaction amount for the access transaction. The first authorization request message is used to authenticate the portable consumer device and is not used to authorize the access transaction. The method also includes transmitting the first authorization request message, receiving an authorization response message comprising an authentication result, allowing the user to enter a restricted area restricted by the gate access device when the authentication result is positive, generating a second authorization request message, transmitting the second authorization request message comprising the identification information and the transaction amount for the access transaction to the server computer, and receiving a second authorization response message from the server computer. The second authorization response message indicates whether the access transaction is authorized or not authorized.

Another embodiment of the invention is directed to a method comprising receiving, at a server computer, a first authorization request message comprising identification information without a transaction amount for a transaction from a gate access device, determining, by the server computer, an authentication result, generating a first authorization response message comprising the authentication result, transmitting the first authorization response message to the gate access device, receiving a second authorization request message comprising the identification information and the transaction amount for the transaction, and transmitting a second authorization response message to the gate access device.

Another embodiment of the invention is directed to a server computer comprising a non-transitory computer readable medium coupled to the processer, the non-transitory computer readable medium comprises code executable by the processor for implementing a method. The method comprises receiving, at a server computer, a first authorization request message comprising identification information without a transaction amount for a transaction from a gate access device, determining, by the server computer, an authentication result, generating a first authorization response message comprising the authentication result, transmitting the first authorization response message to the gate access device, receiving a second authorization request message comprising the identification information and the transaction amount for the transaction, and transmitting a second authorization response message to the gate access device.

Further details regarding embodiments of the invention can be found in the Detailed Description and the Figures.

DETAILED DESCRIPTION

In embodiments of the invention, identification information in a portable consumer device is read by a reader in a gate access device. The identification information may include information including a primary account number (PAN) and is associated with a user that is conducting an access transaction. A local black list and a local white list may be checked to determine if the portable consumer device is authentic or not. If the identification information is not in the black list or the white list, then the gate access device generates and sends a first authorization request message comprising the identification information without a transaction amount to the issuer. A first authorization response message is received from the issuer and includes an authentication result. If the authentication result is positive, then the gate access device or the access host computer generates and sends a second authorization request message comprising the identification information and an amount for the access transaction to an issuer computer via a payment processing network. An authorization response message is subsequently received by the gate access device. The second authorization response message indicates whether the access transaction is authorized or not authorized. The transmission of the second authorization request and response messages may occur after the user has entered the restricted area of the transit system or after the user has completed his journey.

Prior to discussing specific embodiments of the invention, some terms may be described in detail.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a portable consumer device or payment account. The authorization request message may include an issuer account identifier that may be associated with a portable consumer device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. In embodiments of the invention, however, an authorization request message may be solely used for authentication.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant. In some embodiments, the authorization response message can be used for authentication of a portable consumer device and/or the user without requesting authorization to conduct a transaction using the portable consumer device.

"Identification information" may include any suitable information associated with an account (e.g. a payment account and/or portable consumer device associated with the account). Such information may be directly related to the account or may be derived from information related to the account. Examples of account information may include an account identifier such as a PAN (primary account number or "account number") or account token (e.g., a PAN substitute), user name, expiration date, CVV (card verification value), dCVV (dynamic card verification value), CVV2 (card verification value 2), CVC3 card verification values, etc. CVV2 is generally understood to be a static verification value associated with a portable consumer device. CVV2 values are generally visible to a user (e.g., a consumer), whereas CVV and dCVV values are typically embedded in memory or authorization request messages and are not readily known to the user (although they are known to the issuer and payment processors).

A "portable consumer device" may refer to any device that may be used to conduct a financial transaction, such as to provide payment information to a merchant. A portable consumer device may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. If the portable consumer device is in the form of a debit, credit, or smartcard, the portable consumer device may also optionally have features such as magnetic stripes. Such devices can operate in either a contact or contactless mode.

"Short range communication" or "short range wireless communication" may comprise any method of providing short-range contact or contactless communications capability, such as RFID, Bluetooth™, infra-red, or other data transfer capability that can be used to exchange data between a portable consumer device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g., to a range of less than 1 meter, less than 10 centimeters, or less than 2.54 centimeters) for security, technical, and/or practical considerations. For instance, it may not be desirable for a POS terminal to communicate with every portable consumer device that is within a 2 meter radius because each of those portable consumer devices may not be involved in a transaction, or such communication may interfere with a current transaction involving different financial transaction devices. Typically the portable consumer device or the access device also includes a protocol for determining resolution of collisions (i.e., when two portable consumer devices are communicating with the access device simultaneously). The use of short range communications may be used when the merchant and the consumer are in close geographic proximity, such as when the consumer is at the merchant's place of business.

An "issuer" is typically a business entity (e.g., a bank) which maintains financial accounts for a consumer and often issues a portable device such as a credit or debit card to the consumer.

A "merchant" is typically an entity that engages in transactions and can sell goods or services.

An "acquirer" is typically a business entity (e.g., a commercial bank) that has a business relationship with a particular merchant or other entity. Some entities can perform both issuer and acquirer functions. Embodiments of the invention encompass such single entity issuer-acquirers.

A "payment processing network" may include a computer system that processes payments between merchants and issuers. It may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. A payment processing network computer may include a server computer. A payment processing network computer may use any suitable wired or wireless network, including the Internet.

A payment processing network may be disposed between the acquirer computer and the issuer computer. Furthermore, the merchant computer, the acquirer computer, the payment processing network, and the issuer computer may all be in operative communication with each other (i.e. one or more communication channels may exist between each of the entities, whether or not these channels are used in conducting a financial transaction).

A "server computer" may include any suitable computer that can provide communications to other computers and receive communications from other computers. A server computer may include a computer or cluster of computers. For example, the server computer can be a mainframe, a minicomputer cluster, or a group of servers functioning as a unit. In one example, a server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. Data transfer and other communications between components such as computers may occur via any suitable wired or wireless network, such as the Internet or private networks.

Specific embodiments of the invention are described in detail below. The specific embodiments that are described are directed to transit systems, transactions, and methods. Embodiments of the invention, however, are not limited thereto. Embodiments of the invention can apply to other types of transactions including transactions that allow a person to enter a venue such a sports stadium, movie theater, museum, etc.

Figure 1:
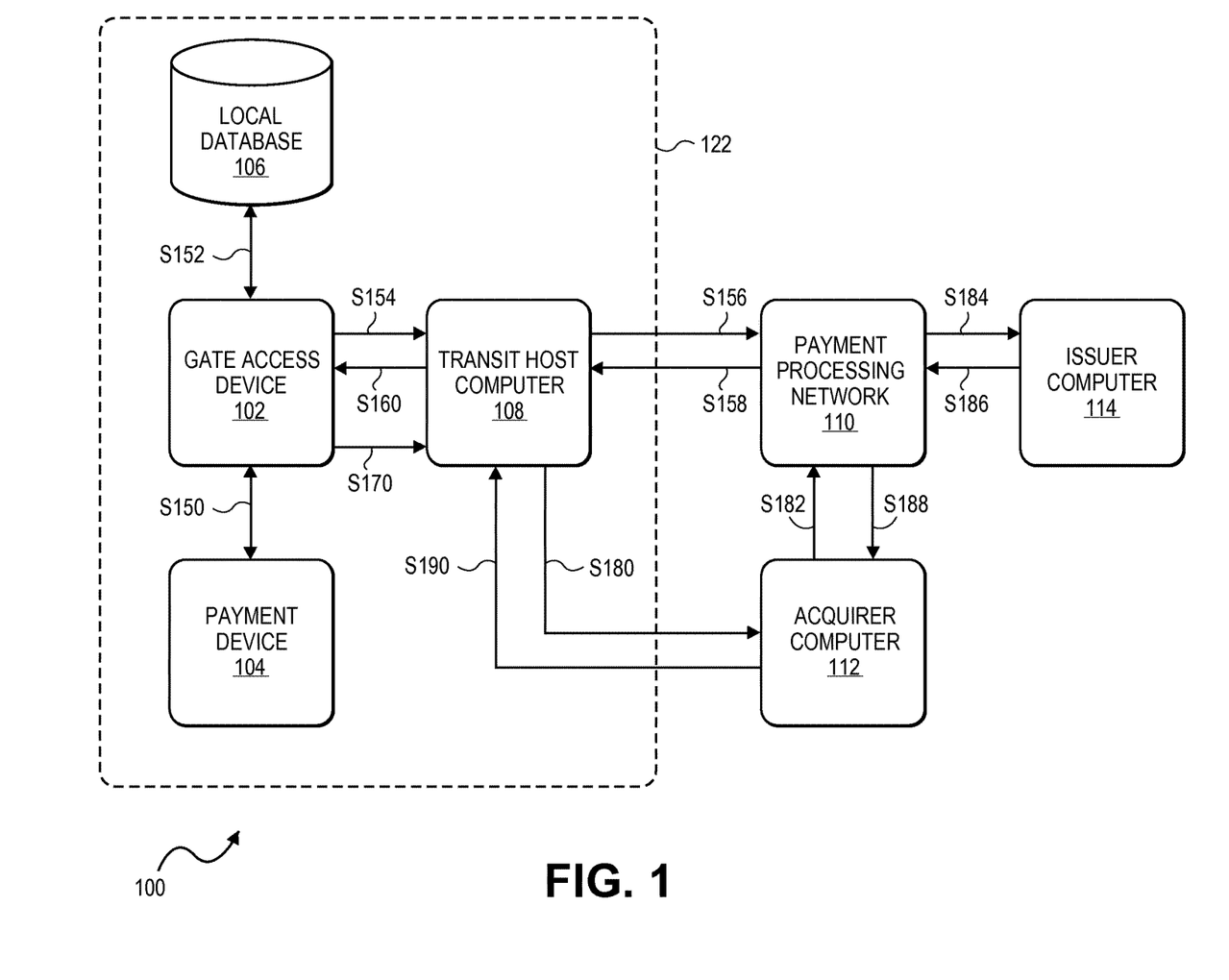
FIG. 1 shows a system according to an embodiment of the invention.

FIG. 1 shows a system 100 comprising a number of components. The system 100 comprises a transit location 122 comprising a transit host computer 108 and a gate access device 102 coupled to the transit host computer 108. A local database 106 may be in communication with or within the gate access device 102 (or in the gate access device 102) and the transit host computer 108. A payment device 104 (which may alternatively be referred to as a portable consumer device) such as a credit or debit card may interact with the gate access device 104.

The local database 106 may be located physically close to or within the gate access device 102. The local database 106 may include a white list of account information for clearly good accounts and a black list of account information for clearly bad or potentially fraudulent accounts. The database may be a conventional, fault tolerant, relational, scalable, secure database such as Oracle or Sybase.

The transit location 122 may be a train station, bus station, airport, etc. It may include a restricted area (e.g., an area where a person may board a train, plane, bus, etc.). As noted above, in other embodiments, the transit location 122 could be another type of access location such as a sports stadium.

The transit host computer 108 may be in communication with and operatively coupled to a payment processing network 110 and an acquirer computer 112. The acquirer computer 112 may be associated with an acquirer processor. In some embodiments, the connection between the transit host computer 108 and the payment processing network may be an MDEX connection, which may not pass through the acquirer computer 112. In other embodiments, communication between the transit host computer 108 and the payment processing network 114 may occur via the acquirer computer 112. The payment processing network may be operatively coupled to and in communication with the issuer computer 114.

Figure 2A:
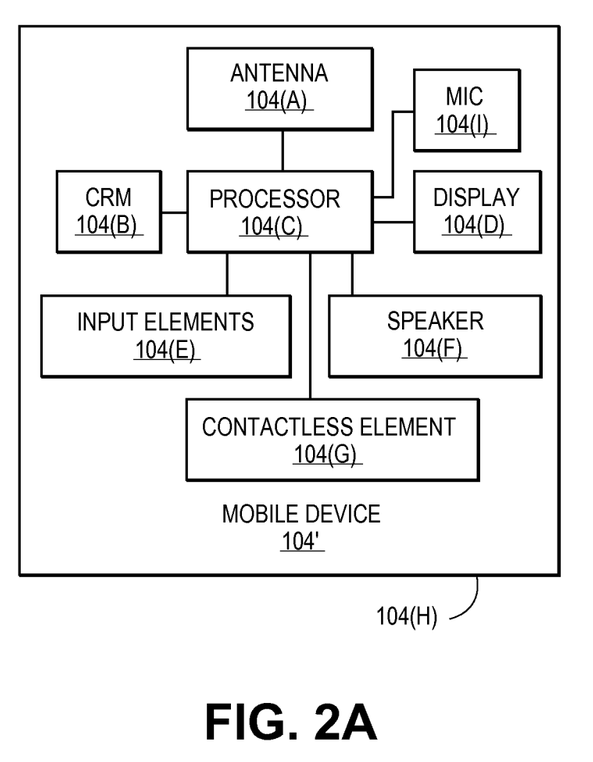
FIG. 2A shows a block diagram of an exemplary portable consumer device in the form of a phone.
Figure 2B:
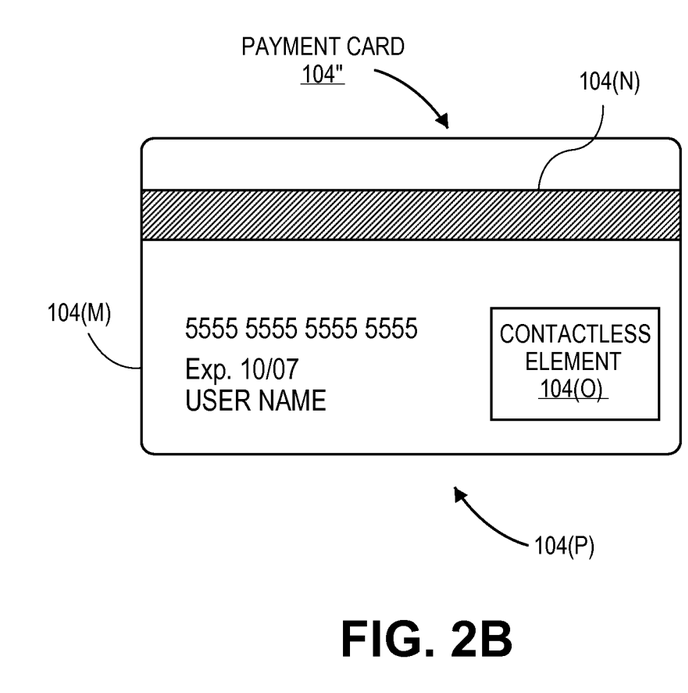
FIG. 2B shows a diagram of an exemplary portable consumer device in the form of a payment card.

FIGS. 2A and 2B show exemplary portable consumer devices that can be used in embodiments of the invention. The portable consumer devices may be "open loop" type payment devices. An open loop payment device is one that can be used at many different merchants, unlike a merchant specific gift card which can only be used at one merchant.

An exemplary portable consumer device 104' in the form of a phone may comprise a computer readable medium and a body as shown in FIG. 2A. (FIG. 2A shows a number of components, and the portable consumer devices according to embodiments of the invention may comprise any suitable combination or subset of such components.) A computer readable medium 104(B) may be present within a body 104(H), or may be detachable from it. The body 104(H) may be in the form of a plastic substrate, housing, or other structure. The computer readable medium 104(B) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 104'.

In some embodiments, and regardless of the type of portable consumer device that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 104' may further include a contactless element 104(G), which is typically implemented in the form of a semiconductor chip (or other data storage element) with an associated wireless transfer (e.g., data transmission) element, such as an antenna. Contactless element 104(G) is associated with (e.g., embedded within) portable consumer device 104' and data or control instructions transmitted via a cellular network may be applied to contactless element 104(G) by means of a contactless element interface (not shown). The contactless element interface functions to permit the exchange of data and/or control instructions between the mobile device circuitry (and hence the cellular network) and the optional contactless element 104(G).

Contactless element 104(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 104' and an interrogation device. Thus, the portable consumer device 104' is capable of communicating and transferring data and/or control instructions via both cellular network and near field communications capability.

The portable consumer device 104' may also include a processor 104(C) (e.g., a microprocessor) for processing the functions of the portable consumer device 104' and a display 104(D) to allow a consumer to see phone numbers and other information and messages. The portable consumer device 104' may further include input elements 104(E) to allow a consumer to input information into the device, a speaker 104(F) to allow the consumer to hear voice communication, music, etc., and a microphone 104(I) to allow the consumer to transmit his/her voice through the portable consumer device 104'. The portable consumer device 104' may also include an antenna 104(A) for wireless data transfer (e.g., data transmission).

If the portable consumer device is in the form of a debit, credit, or smartcard, the portable consumer device may also optionally have features such as magnetic stripes. Such devices can operate in either a contact or contactless mode.

An example of a portable consumer device 104" in the form of a card is shown in FIG. 2B. FIG. 2B shows a plastic substrate 104(M). A contactless element 104(O) for interfacing with an access device 34 may be present on or embedded within the plastic substrate 104(M). Consumer information 104(P) such as an account number, expiration date, and consumer name may be printed or embossed on the card. Further, a magnetic stripe 104(N) may also be on the plastic substrate 104(M). The portable consumer device 104" may also comprise a microprocessor and/or memory chips with user data stored in them.

As shown in FIG. 2B, the portable consumer device 104" may include both a magnetic stripe 104(N) and a contactless element 104(O). In other embodiments, both the magnetic stripe 104(N) and the contactless element 104(O) may be in the portable consumer device 104". In other embodiments, either the magnetic stripe 104(N) or the contactless element 104(O) may be present in the portable consumer device 104".

Figure 3:
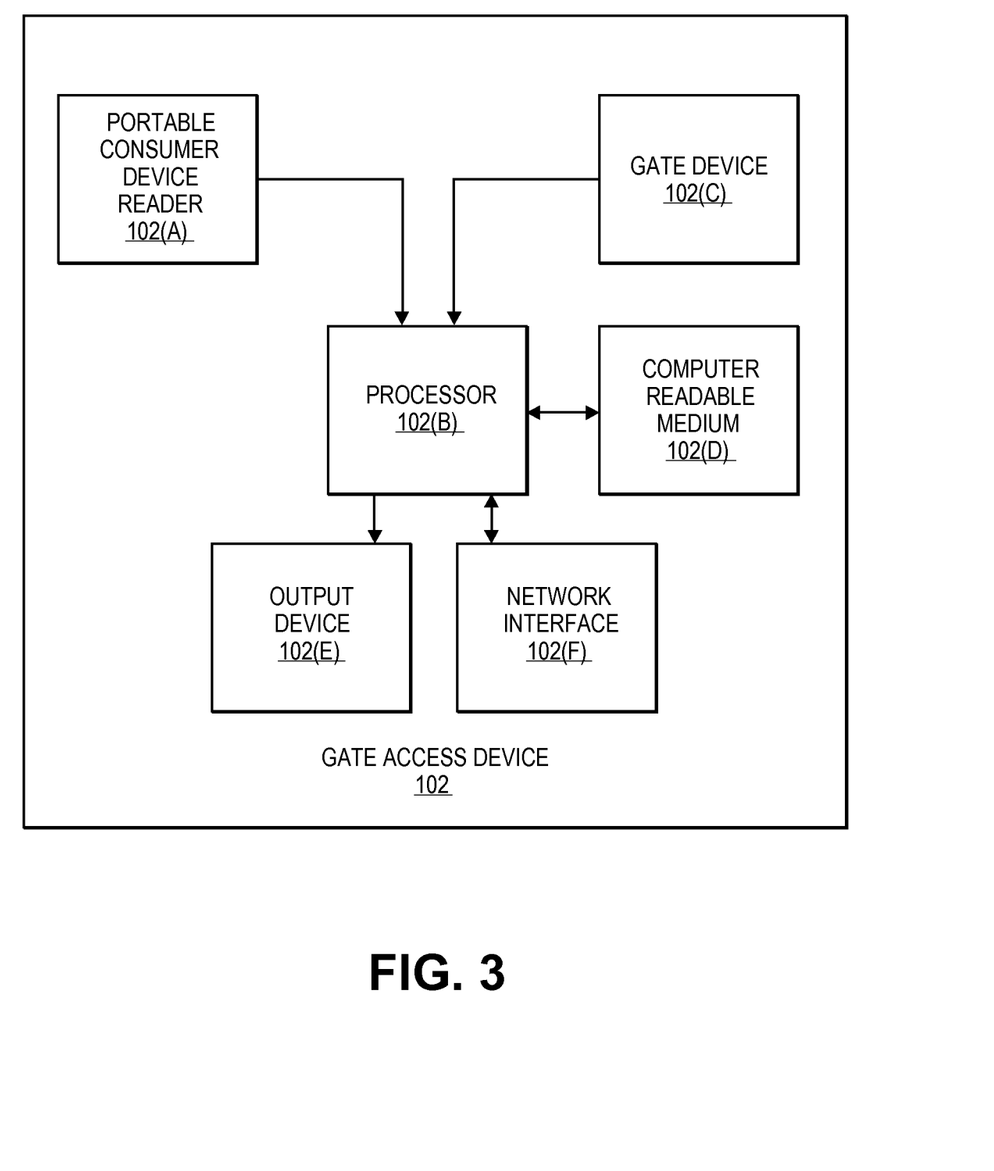
FIG. 3 shows a block diagram of a gate access device.

FIG. 3 shows a block diagram showing basic components that may reside in an exemplary gate access device 102. An exemplary gate access device 14 may comprise a processor 102(B). It may also comprise a computer readable medium 102(D), a portable consumer device reader 102(A), a gate device 102(C) such as a turnstile, a barrier, a gate etc., an output device 102(E), and a network interface 102(F), all operatively coupled to the processor 102(B). A housing may house one or more of these components. Exemplary portable consumer device readers can include RF (radio frequency) antennas, magnetic stripe readers, etc. that interact with the portable consumer device 104. Suitable output devices may include displays and audio output devices. Exemplary computer readable media may include one or more memory chips, disk drives, etc. In some embodiments, an output device could also be caused to operate by an appropriate gate device, if the gate device actuates to cause the output device to provide a message indicating that the user is authorized to proceed.

The computer readable medium 102(D) may store code or instructions for allowing gate access device 104 to operate in the manner described herein. The instructions may be executed by the processor 102(B). The computer readable medium 102(D) may comprise code or instructions for causing the processor 102(B) to implement a method comprising: reading, by a gate access device, identification information from a portable consumer device associated with a user that is conducting an access transaction; generating, by the gate access device a first authorization request message comprising the identification information without a transaction amount corresponding to the transaction, wherein the first authorization request message is used to authenticate the portable consumer device and is not used to authorize the access transaction; transmitting, to a server computer, the first authorization request message; receiving, from the server computer, an authorization response message comprising an authentication result; allowing the user to enter a restricted area restricted by the gate access device when the authentication result is positive; generating, by the gate access device or the access host computer, a second authorization request message; transmitting the second authorization request message comprising the identification information and an amount for the access transaction to the server computer; and receiving a second authorization response message from the server computer, wherein the second authorization response message indicates whether the access transaction is authorized or not authorized.

The network interface 102(F) may allow the gate access device 102 to send and receive messages from the transit host computer 108, acquirer computer 112, payment processing network 110, and/or issuer computer 114.

It is also understood that the transit host computer 108 in FIG. 1 may also contain a similar computer readable medium as the computer readable medium 102(D) in the gate access device 102. That is, in some embodiments, data may be passed from the gate access device 102 to the transit host computer 108 and the transit host computer 108 may generate and transmit authorization request messages to the payment processing network 110 and/or the issuer computer 114.

Figure 4:
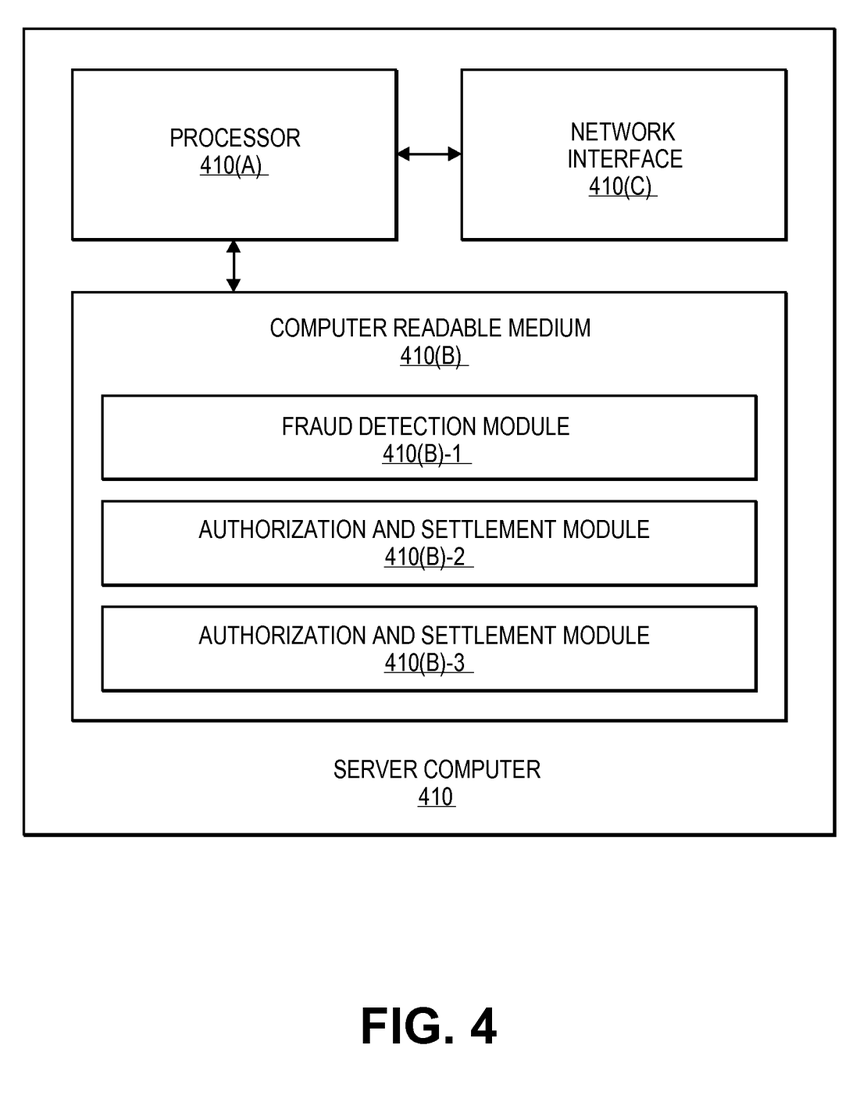
FIG. 4 shows a block diagram of a server computer.

FIG. 4 shows a block diagram of a server computer 410 which may reside within a payment processing network 110. The server computer 410 comprises a processor 410(A) and a computer readable medium 410(B) and a network interface 410(C) coupled to the processor 410(A).

In some embodiments, a database (not shown) with a black list and a white list may also be coupled to the server computer 410 in the payment processing network 110. The black list and white list may be different than the black list and white list stored in the local database 106. For example, the black list and white list in the payment processing network 110 may contain lists of account credentials (e.g., account numbers) that are clearly good or clearly bad based upon transaction data that is not specifically associated with access or transit transactions.

The computer readable medium 410(B) may comprise a fraud detection module 410(B)-1, an authorization module 410(B)-2, and a clearing and settlement module 410(B)-3. It may also comprise code, executable by the processor 410(A) for implementing a method comprising receiving, at a server computer, a first authorization request message comprising identification information without a transaction amount from a gate access device; determining, by the server computer, an authentication result; generating a first authorization response message comprising the authentication result; transmitting the first authorization response message to the gate access device; receiving a second authorization request message comprising the identification information and a transaction amount; and transmitting the second authorization request message to the gate access device.

The fraud detection module 410(B)-1 may comprise code that causes the processor 410(A) to implement a fraud detection and scoring process. The fraud detection module 410(B)-1 may utilize any suitable fraud detection algorithm, and may take into account past transactions conducted using an account associated with a credit, debit, or prepaid card, the location of the current transaction relative to the locations of recent conducted transactions, determining whether the account is associated with other suspect activity (e.g., fraud pertaining to another account that has the same billing address as the current account being used to conduct the transit transaction), etc.

The authorization module 410(B)-2 may comprise code that causes the processor 410(A) to perform authorization processing. The authorization module 410(B)-2 may contain logic that can cause the processor 410(A) to route authorization request messages to the correct issuer computers and to route authorization response messages to the correct merchant computers.

The clearing and settlement module 410(B)-3 may comprise code that causes the processor 410(A) to perform clearing and settlement processing. The clearing and settlement module 410(B)-3 may contain logic that can cause the processor 410(A) to generate and route clearing messages, and logic that can cause the processor 410(A) to perform settlement between acquirers and issuers.

A method according to embodiments of the invention can be described with respect to FIGS. 1, 3, 4, and 5.

A user (not shown) may attempt to enter a restricted area in a transit location by interacting with the gate access device 102. In step S150, the user may use a portable consumer device 104 to interact with the reader 102(A) of the gate access device 102. For example, the user's portable consumer device 104 may interact with the gate access device 102 using a short range communication or short range wireless communication process, or a contact mode of communication (e.g., passing a magnetic stripe through a reader at the gate access device 102). Information such as an account number, cryptograms, and other identification information may pass from the portable consumer device 104 to the gate access device 102. The gate access device 102 may also pass information to the portable consumer device 104.

The gate access device 102 may include a turnstile or gate device 102(C) to allow a patron to pass by the gate access device 102 into a restricted zone (e.g., where trains may be loaded with passengers) if the person is allowed to enter. It may alternatively prevent a patron from passing by the gate access device 102 if the patron has not been authorized to pass into the restricted zone.

In step S152, the gate access device 102 (or processor therein) may then communicate with the local database 106 to see if the account number associated with the portable consumer device 104 is on a "white list" or a "black list." The white list may be a list including account numbers (or other data such as cryptograms) that have are clearly considered to be "good" and are not likely to involve fraud. For example, a particular account number associated with a portable consumer device may have been used every day for three months without any incidence of fraudulent activity or the like. The "black list" may be a list of account numbers or the like that are considered fraudulent or "bad." For example, a payment card or phone may have been reported stolen by the owner, and this information can be stored in the black list. If the account number is on the black list, then the user is prevented from proceeding to the restricted area. If the account number is on the white list, then the user is allowed to proceed to the restricted area. The white list and the black list are used to allow the user to quickly access the restricted zone.

In some embodiments, if the account number (or cryptogram or other identifying information) that is received is neither on the black list or the white list, then additional authentication may be needed before allowing the user into the restricted area. The processor 102(B) in the gate access device 102 may generate a first authorization request message. In step S154, this message may be transmitted to the transit host computer 108 via the network interface 102(F), and to the payment processing network 110 in step S156. The server computer 410 in the payment processing network 110 may then validate the received account number, cryptogram, and any other authentication data from the portable consumer device 104 to authenticate it. Note that the first authorization request message does not request authorization for the transaction, but is solely used to authenticate the portable consumer device 104, or possibly the user. Consequently, the first authorization request message may not have an amount corresponding to the transaction being conducted (e.g., a zero dollar amount or no amount in the amount data field in the first authorization request message).

In some embodiments, the first authorization request message may be sent from the gate access device 102 or the transit host computer 108 to the payment processing network 110 directly without passing through the acquirer computer 112. For example, in some embodiments, the nodes involved in the transaction at the fare gate are minimized. Under such conditions, the fare gate (or other type of gate access device) can process a transaction directly into a payment processing network hub (such as a Visa Direct Exchange (DEX) hub). This configuration is desirable, but the system architecture may have other nodes for purposes of transaction accounting or database storage. Any additional nodes would quickly forward a transaction authorization request to the payment processing network hub (e.g., Visa DEX) and expect an immediate authorization or decline from the issuer (e.g., through the Visa DEX). In other embodiments of the invention, the first authorization request message may pass from the transit host computer 108 and to the payment processing network 110 through the acquirer computer 112.

Referring to FIG. 4, the fraud detection module 410(B)-1 may perform a fraud analysis on the authorization request message, and may generate a fraud score. The fraud score may be a binary value (e.g., 0=likely fraudulent; 1=not likely fraudulent) or may be a value on a scale (e.g., a score from 0 to 100, where 0 is low fraud and 100 is high fraud).

The fraud score many be generated in any suitable manner using any suitable data. It may be generated using cryptograms (CVV or dCVV values) that were present on the portable consumer device, data regarding other transactions conducted at other merchants using the account, the location of transaction, whether the account data is on a black list or white list in the payment processing network, etc.

In embodiments of the invention, the server computer 410 may store keys and other data that will allow it to recreate cryptograms. Corresponding cryptograms may be received in authorization request messages and the received cryptograms verified against independently generated or previously stored cryptograms. If the received cryptogram and a generated or previously stored cryptogram match, then the payment device 104 may be deemed authentic.

After the fraud detection module 410(B)-1 analyzes the first authorization response message, a first authorization response message is generated by the server computer 410 and is returned to the transit host computer 108 and gate access device 102 in steps S158 and S160. The first authorization response message contains the authentication result (e.g., the fraud score) as determined by the payment processing network 110. If the first authorization response message contains a negative authentication result, the gate access device 102 will not allow the user to pass into the restricted area. If the first authorization response message contains a positive authentication result, then the gate access device 102 allows the user to enter the restricted area. The criteria as to whether an authentication result is positive may be set by the transit authority operating the gate access device 102 and the transit host computer 108.

The process of authenticating the portable consumer device 104, which may include at least steps S154, S156, S158, and S160 may occur within a time period of less than 1 second, preferably less than about 300 milliseconds. If the gate access device 102 does not receive the first authorization response message within a predetermined amount of time after reading the identification information from the portable consumer device, the gate access device 102 may be programmed to allow the user to enter the restricted area.

Since the first authorization request message is not requesting authorization for a transaction, but is simply requesting that a fraud analysis and/or that the portable consumer device being used to conduct the transaction be validated, the first authorization request message need not be forwarded to the issuer computer. In some embodiments, however, it is possible for the first authorization request message to be forwarded to the issuer computer 114 so that the issuer computer 114 can perform its own authentication and/or fraud processing on the account. In such embodiments, the issuer computer 114 can generate and transmit a corresponding first authorization response message back to the transit host computer 108 and/or the gate access device 102.

Also, in some embodiments, the white list or the black list in the local database 106 may be updated with the authentication result received from the payment processing network 110. For example, if the payment processing network 110 determines that the portable consumer device 104 is fraudulent, then the account number or other identifying information may be automatically placed on the blacklist in the local database 106. Access using that portable consumer device would therefore be prevented in the future. In some embodiments, the first authentication request message may also be referred to as an authentication request message. The first authorization request message may contain information such as an account number, expiration date, and cryptogram, but does not have a transaction amount in the message as a standard authorization request message would normally have.

At a later point in time, the processor in the gate access device 102 or the processor in the transit host computer 108 may then generate and transmit a second authorization request message to the issuer computer 114 via the transit host computer 108, the acquirer computer 112, and the payment processing network 110 as shown in steps S180, S182, and S184. The second authorization request message may take the form of a standard authorization request message and may contain a transaction amount for one or multiple transactions. For example, the authorization request message sent by the transit host computer 108 may contain an amount that aggregates the fares incurred by the user every day over a period of one week (e.g., a single authorization request message for $50 if a $10 fare is incurred for trips from Monday to Friday). The issuer computer 114 may then determine if the second authorization request message is authorized, and may generate an authorization response message. In steps S186, S188, and S190, the authorization response message is transmitted from the issuer computer 114 and to the host computer 108 via the payment processing network 110 and the acquirer computer 112.

At the end of the day or some later point in time, a clearing and settlement process between the acquirer computer 112 and the issuer computer 114 occurs via the payment processing network 110. The clearing and settlement module 410(B)-2 in FIG. 5 may be used to conduct the clearing and settlement processes.

Embodiments of the invention have a number of advantages. Because a pure authentication process can be performed by a payment processing network before allowing a patron to enter a restricted area in a transit location or the like, the transit location can leverage the authentication tools used by the payment processing network. The authentication processing can occur within 300 milliseconds so that the patron will not be delayed from entering the restricted area. Further, because the portable consumer device can be used as an open loop payment card as well as an access card, one set of authentication tools may reside at the payment processing network, instead of having a separate set of authentication tools at the transit location. Further, by splitting authentication and authorization in embodiments of the invention, authorization transactions can be bundled together without impacting authentication. For example, if a patron conducts one small transit transaction every day for five consecutive days, the transit agency may wish to bundle those five transactions into a single authorization request where payment is requested. This can save on transaction fees and transaction processing as fewer transaction authorizations are requested. However, even though transaction authorizations are communicated infrequently to a payment processing network and issuer, authentication can occur with every transaction.

Each of the transit host computer 108, the payment processing network 110, the issuer computer 114, and the acquirer computer 112 may comprise a server computer. The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

Figure 5:
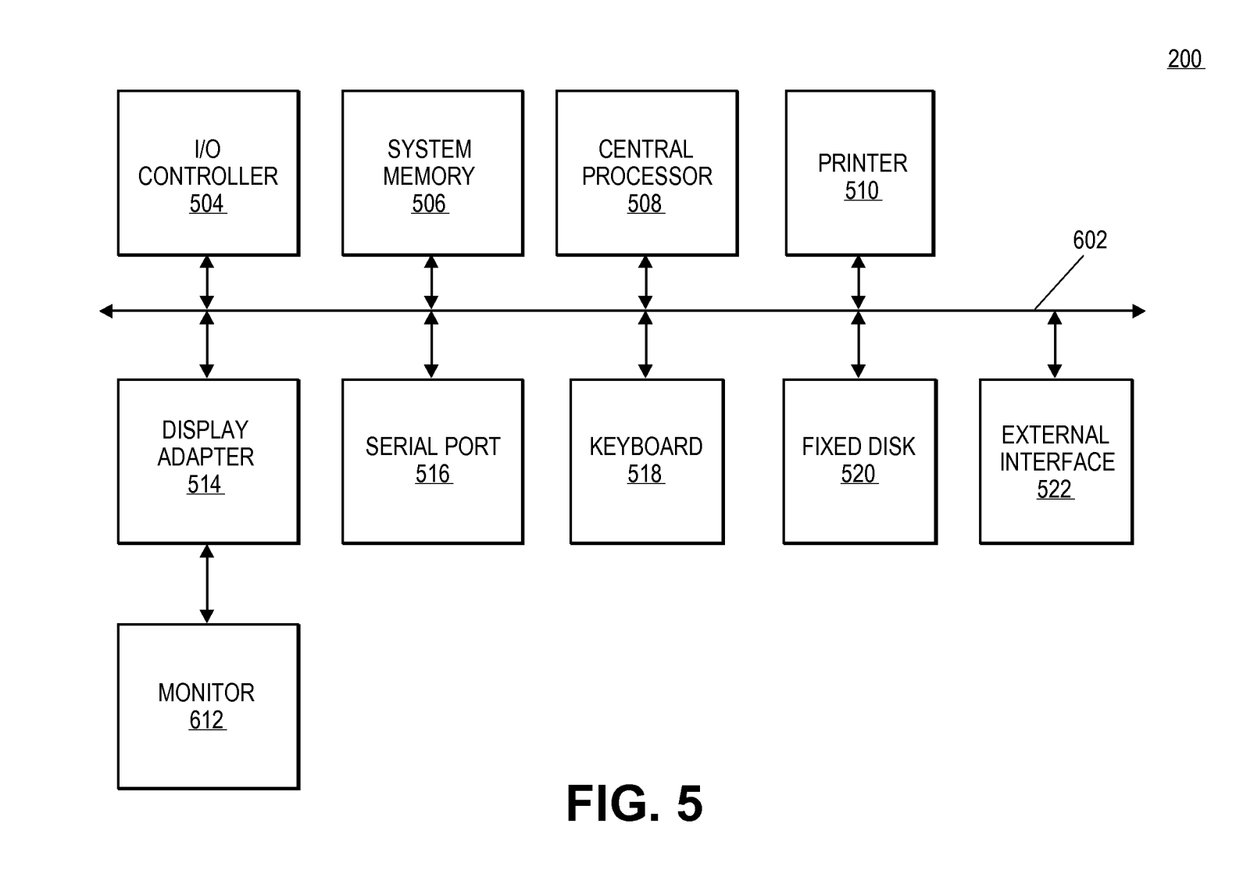
FIG. 5 shows a block diagram of a computer apparatus.

FIG. 5 is a high level block diagram of a computer system that may be used to implement any of the entities or components described above. The subsystems shown in FIG. 6 are interconnected via a system bus 502. Additional subsystems include a printer 510, keyboard 518, fixed disk 520, and monitor 512, which is coupled to display adapter 514. Peripherals and input/output (I/O) devices, which couple to I/O controller 504, can be connected to the computer system by any number of means known in the art, such as a serial port. For example, serial port 516 or external interface 522 can be used to connect the computer apparatus to a wide area network such as the Internet, a mouse input device, or a scanner. The interconnection via system bus 502 allows the central processor 508 to communicate with each subsystem and to control the execution of instructions from system memory 506 or the fixed disk 520, as well as the exchange of information between subsystems. The system memory 506 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
reading, by a gate access device, an account identifier and a cryptogram from a portable consumer device associated with a user that is conducting an access transaction;
determining, a transaction amount to be associated with the access transaction;
determining, by the gate access device, that the account identifier is not on a black list or on a white list;
in response to determining that the account identifier is not on the black list or on the white list, generating, by the gate access device or an access host computer coupled to the gate access device, a first authorization request message comprising the account identifier, the cryptogram, and a first transaction amount data field, the first transaction amount data field indicating that the first authorization request message is for authentication by virtue of being empty or including a value of zero;
transmitting, by the gate access device or the access host computer, to a payment processing computer, the first authorization request message;
receiving, by the gate access device or the access host computer, from the payment processing computer, a first authorization response message comprising an authentication result, the authentication result including a fraud score;
determining, by the gate access device, that the authentication result is positive, the authentication result being positive when the fraud score is less than a threshold value;
in response to determining that the authentication result is positive, actuating, by the gate access device, a gate device such that the user can physically enter a restricted physical area;
in response to determining that the authentication result is not positive, preventing actuating the gate device such that the user cannot physically enter the restricted physical area;
generating, by the gate access device or the access host computer after actuating the gate device, a second authorization request message comprising the account identifier and a second transaction amount data field, the second transaction amount data field including the transaction amount for the access transaction;
transmitting, by the gate access device or the access host computer, to the payment processing computer, the second authorization request message comprising the account identifier and the transaction amount for the access transaction; and
receiving, by the gate access device or the access host computer, from the payment processing computer, a second authorization response message, wherein the second authorization response message indicates that the access transaction is authorized.

2. The method of claim 1 wherein the access transaction is a transit transaction, and wherein the first authorization request message passes to the payment processing computer through an acquirer computer.

3. The method of claim 1 wherein the user is allowed to enter the restricted physical area within a predetermined amount of time after reading the account identifier.

4. The method of claim 3 wherein the predetermined amount of time is 300 milliseconds, 500 milliseconds, or 1 second.

5. The method of claim 1 wherein the portable consumer device is an open-loop payment card.

6. The method of claim 1 wherein the payment processing computer does not transmit the first authorization request message to an issuer computer, and wherein the payment processing computer does not authorize the access transaction.

7. The method of claim 1 wherein the payment processing computer generates the fraud score based on transaction data for previous transactions that were conducted using the account identifier, and that were conducted at other merchants.

8. The method of claim 1 wherein the payment processing computer generates the fraud score based on transaction data for previous transactions that were conducted with the account identifier, and that were not access transactions.

9. The method of claim 1 wherein the second authorization response message is received from the payment processing computer via an acquirer computer.

10. The method of claim 1 wherein the payment processing computer is associated with a payment processing network.

11. The method of claim 1 wherein the payment processing computer processes transactions between multiple merchant computers and multiple issuer computers.

12. The method of claim 1, wherein the access transaction is a first access transaction, and further comprising:
adding the account identifier to the white list based on the second authorization response message;
reading, by the gate access device, the account identifier from the portable consumer device for a second access transaction;
determining by the gate access device that the account identifier is on the white list;
causing the gate access device to allow the user to enter the restricted physical area based on determining the account identifier is on the white list;
generating, by the gate access device or the access host computer, a third authorization request message comprising the account identifier and a second amount for the second access transaction;
transmitting, to the payment processing computer, the third authorization request message comprising the account identifier and the second amount for the second access transaction, wherein the payment processing computer transmits the third authorization request message to an issuer computer, wherein the issuer computer authorizes the second access transaction based on the account identifier and the second amount, and wherein the issuer computer generates a third authorization response message and transmits the third authorization response message to the payment processing computer; and
receiving, from the payment processing computer, the third authorization response message, wherein the third authorization response message indicates that the second access transaction is authorized.

13. The method of claim 1, wherein the first authorization request message is formatted as an ISO 8583 message, and wherein the second authorization request message is formatted as an ISO 8583 message.

14. The method of claim 1, wherein the first authorization request message is not a standard authorization request message, and wherein the payment processing computer does not transmit the first authorization request message to an issuer computer because the first authorization request message is not a standard authorization request message.

15. A gate access device comprising:
a processor;
a reader coupled to the processor;
a gate device coupled to the processor; and
a non-transitory computer readable medium coupled to the processor, the non-transitory computer readable medium comprising code executable by the processor for implementing a method comprising:
reading, by the reader, an account identifier and a cryptogram from a portable consumer device associated with a user that is conducting an access transaction;
determining that the account identifier is not on a black list or on a white list;
in response to determining that the account identifier is not on the black list or on the white list, generating a first authorization request message comprising the account identifier, the cryptogram, and a first transaction amount data field, the first transaction amount data field indicating that the first authorization request message is for authentication by virtue of being empty or including a value of zero;
transmitting, to a payment processing computer, the first authorization request message;
receiving, from the payment processing computer, a first authorization response message comprising an authentication result, the authentication result including a fraud score;
determining, by the gate access device, that the authentication result is positive, the authentication result being positive when the fraud score is less than a threshold value;
in response to determining that the authentication result is positive, actuating the gate device such that the user can physically enter a restricted physical area;
generating, after actuating the gate device, a second authorization request message comprising the account identifier and a second transaction amount data field, the second transaction amount data field including an amount for the access transaction;
transmitting to the payment processing computer, the second authorization request message comprising the account identifier and the amount for the access transaction; and
receiving from the payment processing computer, a second authorization response message, wherein the second authorization response message indicates that the access transaction is authorized.

16. The gate access device of claim 15 wherein the access transaction is a transit transaction.

17. The gate access device of claim 16 wherein the reader is a contactless reader.

* * * * *